United States Patent [19]

Puydak et al.

[11] Patent Number: 5,073,597

[45] Date of Patent: Dec. 17, 1991

[54] DYNAMICALLY VULCANIZED ALLOYS HAVING TWO COPOLYMERS IN THE CROSSLINKED PHASE AND A CRYSTALLINE MATRIX

[75] Inventors: Robert C. Puydak, Cranbury; Donald R. Hazelton, Chatham, both of N.J.; Trazollah Ouhadi, Liege, Fed. Rep. of Germany

[73] Assignee: Advanced Elastomer Systems, L. P., St. Louis, Mo.

[21] Appl. No.: 359,060

[22] Filed: May 26, 1989

[51] Int. Cl.$^5$ .................. C08L 15/02; C08L 23/16; C08L 23/26; C08L 9/00; C08J 3/24
[52] U.S. Cl. .................. 525/193; 525/194; 525/196; 525/197; 525/198; 525/211; 525/232; 525/237
[58] Field of Search .............. 525/193, 194, 196, 237, 525/211, 232

[56] References Cited

U.S. PATENT DOCUMENTS

| | | | |
|---|---|---|---|
| 4,130,534 | 12/1978 | Coran et al. | 260/33.6 |
| 4,130,535 | 12/1978 | Coran et al. | 525/232 |
| 4,311,628 | 1/1982 | Sabet et al. | 525/232 |
| 4,480,074 | 10/1984 | Wang | 525/194 |
| 4,607,074 | 8/1986 | Hazelton et al. | 525/196 |
| 4,728,692 | 3/1988 | Sezaki et al. | 525/74 |
| 4,801,651 | 1/1989 | Komatsu et al. | 525/196 |
| 4,810,752 | 3/1989 | Bayar | 525/194 |
| 4,871,796 | 10/1989 | Komatsu et al. | 525/193 |
| 4,873,288 | 10/1989 | Komatsu et al. | 525/193 |
| 4,912,148 | 3/1990 | Kim et al. | 525/194 |

*Primary Examiner*—Carman J. Seccuro

[57] ABSTRACT

A dynamically vulcanized alloy composition having improved tensile strength including a first butyl or halogenated butyl rubber-base elastomer and a second EPM and/or EPDM elastomer in a matrix of a crystalline polyolefinic resin, and processes for producing the improved composition.

17 Claims, No Drawings

DYNAMICALLY VULCANIZED ALLOYS HAVING TWO COPOLYMERS IN THE CROSSLINKED PHASE AND A CRYSTALLINE MATRIX

BACKGROUND OF THE INVENTION

1. Field of the Invention

This invention relates to thermoplastic elastomer blends of polymers that have been prepared by dynamic vulcanization. The polymer blends comprise a crystalline polyolefin plastic matrix, such as polypropylene, and two crosslinked elastomeric polymers wherein one elastomer is butyl or halobutyl rubber and the other is an ethylene-propylene copolymer-based rubber.

2. Background

This invention relates to polymer blends which have a combination of both elastic and thermoplastic properties and which are of significant commercial interest. Such thermoelastic compositions are generally obtained by blending an elastomeric composition with a thermoplastic composition in a way such that the elastomer is intimately and uniformly dispersed as a discrete phase within a continuous phase of the thermoplastic composition. These polymer blends have been given the generic designation of Thermoplastic Olefins ("TPO"). They exhibit some of the properties of a cured elastomer as well as the reprocessibility of a thermoplastic resin. The elastomeric characteristics are enhanced if one component of the blend is a vulcanizable elastomer which is wholly or partially cross-linked.

The earliest work in the curing of a TPO composition was by Gessler and Haslett; see U.S. Pat. No. 3,037,954. That patent teaches the concept of "dynamic curing" wherein a vulcanizable elastomer is dispersed into a resinous thermoplastic polymer and the elastomer is cured while continuously mixing and shearing the polymer blend. The resulting blend is a micro-gel dispersion of cured elastomer in an uncured matrix of resinous thermoplastic polymer which is known as a dynamically vulcanized alloy ("DVA").

Gessler, '954 discloses compositions comprising polypropylene and a rubber such as, inter alia, butyl rubber; chlorinated butyl rubber, polybutadiene, polychloroprene and polyisobutene. Compositions of about 50 to 95 parts polypropylene and about 5 to 50 parts of rubber are disclosed.

The commercially useful DVAs are known to include butyl-based DVA's and EP/EPDM-based DVAs. The tensile strength of butyl-based DVAs has typically been lower than that of EP/EPDM-based DVAs when compared at the same Shore A hardness or polyolefin resin content. Thus, efforts have been directed towards improving the physical properties of butyl-based DVAs.

U.S. Pat. Nos. 3,758,643 and 3,806,558 disclose TPO type polymer blends comprising an olefin thermoplastic resin and an olefin copolymer rubber wherein the rubber is dynamically cured to a partial cure state. The compositions are reprocessible and result in molded products having good surface appearance. However, the potential applications of such blends are limited by their high compression set and/or low softening temperature resulting from only a partial cure of the rubber. Furthermore, the partial peroxide cure utilized in such blends is difficult to control from the standpoint of completeness of reaction, resulting in batch to batch variations in product properties.

U.S. Pat. No. 4,639,487 to Hazelton, et al. is directed to heat shrinkable DVAs including an ethylene copolymer resin blended with a butyl or halogenated butyl rubber. The butyl rubber should be at least partially dynamically vulcanized to a cured state in the presence of the copolymer. The invention is restricted in that peroxide cure systems are specifically excluded. These DVA compositions are said to possess exceptional resiliency, high coefficient of friction surfaces and low compression set.

U.S. Pat. No. 4,212,787 to Matsuda, et al., however, allows the use of peroxide cure systems and is directed to the production of partially cured DVA compositions which include 40-100 wt. % of a peroxide curable copolymer (such as EPDM); 0-60 wt. % of a peroxide decomposing copolymer (such as PE and PP); and 5-100 wt. % of a peroxide non-curable rubber, either polyisobutylene or butyl rubber. One of the objects of the Matsuda invention is to produce a DVA having improved surface appearance. This is effected by improving the fluidity of the DVA, relative to blends as disclosed in U.S. Pat. No. 3,806,558, without degradation of the heat resistance, tensile strength, flexibility, rebound-elasticity, etc.

U.S. Pat. No. 4,202,801 to Petersen relates to the partial dynamic curing of a blend of a monoolefin copolymer rubber, such as saturated EPM or EPDM; a polyolefin resin such as PP or PE, with a conjugated diene rubber such as polybutadiene or polychloroprene. Crystalline polyolefin resin may be used. The cure systems useful for the invention include the peroxides. More than one monoolefin copolymer rubber, conjugated diene rubber and polyolefin resin may be used in combination. The DVAs of this invention are said to provide low compression set and high tensile strength at elevated temperatures.

U.S. Pat. No. 4,340,684 to Bohm, et al. discloses a DVA composition which is said to have very good physical properties, especially tear strength, tensile strength, elongation at break, low temperature impact resistance, minimum creep at high temperatures, and smooth surfaces when injection molded. The compositions, which may be partially cured or uncured, comprise a blend of from about 10 to about 50 wt. % of a crystalline 1-olefin polymer, from about 80 to about 15 wt. % of a styrene-butadiene rubber, and from about 5 to about 55 wt. % of a highly saturated elastomer. The 1-olefin polymer may be polypropylene. The highly saturated elastomer is selected from the class consisting of hydrogenated polybutadiene, polyisobutylene and copolymers thereof such as butyl rubber, ethylene-propylene rubber (EPM), copolymers of ethylene-vinyl acetate, copolymers of ethylene-ethylacrylate, ethylene-propylene-diene monomer (EPDM), a hydrogenated "triblock copolymer of styrene-butadiene-styrene" and combinations thereof.

U.S. Pat. No. 4,607,074 to Hazelton, et al. is directed to a thermoplastic composition which comprises a polyolefin resin and two rubber components. The first rubber component is selected from the group consisting of polyisobutylene and ethylene-propylene copolymer and ethylene-propylene-diene copolymer. The second rubber component is selected from the group consisting of halogenated butyl rubber and polychloroprene. The invention requires the use of a cure system which vulcanizes one rubber but not the other. This results in a TPO having good physical strength characteristics coupled with excellent processability, low hardness and low compression set suitable for use in the manufacture of molded and extruded articles such as gasketing materials, boot seals, tubing, and the like.

U.S. Pat. No. 4,480,074 discloses DVA compositions said to exhibit improved surface characteristics and fabricability wherein the compositions are prepared by blending an unvulcanized, but vulcanizable, monoolefin rubber with a blend containing cured polyolefin rubber with crystalline polyolefin and subsequently vulcanizing such that the final blend comprises about 15-45 parts by weight of crystalline polyolefin and 85-55 parts by weight of vulcanized rubber. EPDM is taught as both the vulcanized polyolefin rubber and the unvulcanized but vulcanizable rubber in the disclosed blends. Dynamic vulcanization utilizing peroxide cure systems, phenolic resin systems, phenylene-bismaleimide and diamine curatives, etc., is disclosed.

Japanese patent application 85,530/87 discloses a TPO composition having excellent mechanical strength, thermal stability, moldability, gas impermeability and damping characteristics. The TPO of the '530 application includes a crystalline polypropylene as a matrix and two elastomers: a bromobutyl rubber and an olefin copolymer rubber such as EPM or EPDM rubber. The composition also includes conventional additives such as process oil. All of the components are combined and vulcanized in a single batch with a peroxide cure system but there is no indication of the inclusion of a peroxide co-agent such as m-phenylene bis-maleimide (HVA-2) or the like. The '530 application's inventors found that while butyl and chlorobutyl rubbers are not cross-linkable with peroxide cures, bromobutyl rubbers are. Moreover, the '530 application's inventors explain that the enhanced physical properties claimed are due to the olefin copolymer rubber which provides flexibility to the TPO and also acts as a binder at the interface between the polypropylene and the bromobutyl rubber.

SUMMARY OF THE INVENTION

The DVAs of this invention have improved physical properties over prior art two-rubber component blends. The inventive DVAs comprise a crystalline polyolefinic resin and two vulcanized or co-vulcanized elastomers: a primary butyl rubber-based elastomer, selected from butyl, chlorobutyl and bromobutyl rubber, and one or more of a secondary EPM or EPDM elastomer. In the process for the production of the invention DVA's:

(1) the elastomers may be simultaneously dynamically vulcanized using at least two specific cure systems in a single mixing stage; or (2) the elastomers may be dynamically vulcanized in a single mixing stage using a cure system effective for both rubbers; or (3) the elastomers may be dynamically vulcanized in a sequence by addition of first a cure system for one rubber, then a cure system effective for the other rubber or for both rubbers; or (4) either elastomer may be independently dynamically vulcanized in a blend with a crystalline polyolefinic phase and the resultant blend may then be combined with the other elastomer, which may have been independently dynamically vulcanized or which may be dynamically vulcanized subsequently.

The final properties of these blends may be tailored by the selection of the rubbers, cure systems, and mixing techniques.

Since butyl and chlorobutyl elastomers tend to fragment when exposed to a peroxide-containing cure system, these cure systems are not recommended for use with these elastomers. However, according to this invention, peroxide-containing cure systems may advantageously be used to cure bromobutyl elastomers in conjunction with a co-agent such as m-phenylene bis maleimide (HVA-2) in processes for the production of improved DVA's.

DETAILED DESCRIPTION

This invention relates to the production of a dynamically vulcanized alloy (DVA) of superior physical properties. The result of this invention is achieved by mixing, in various fashions, a crystalline polyolefin resin with two rubbers: a primary rubber selected from butyl rubber, chlorobutyl rubber, and bromobutyl rubber; a secondary rubber selected from ethylene-propylene rubber (EPM) and ethylene-propylene-diene rubber (EPDM); and cure systems for both rubbers. These mixtures can then be subjected to conditions of dynamic vulcanization, or melt blended where both blends have been independently dynamically vulcanized, to produce the invention DVA which has superior physical properties.

As used in the specification and claims, the term "dynamic vulcanization" means a vulcanization process for a rubber-containing TPO composition wherein the rubber is vulcanized under conditions of high shear, as a result of which, the rubber is simultaneously cross-linked and dispersed as fine particles of a "micro-gel" within the thermoplastic resin matrix. Dynamic vulcanization is effected by mixing the TPO ingredients at a temperature at or above the curing temperature of the rubber in equipment such as roll mills, Banbury mixers, continuous mixers, kneaders or mixing extruders, e.g., twin screw extruders. The unique characteristic of dynamically cured compositions is that, notwithstanding the fact that the rubber component is fully cured, the compositions can be processed and reprocessed by conventional rubber processing techniques such as extrusion, injection molding, compression molding, etc. Scrap or flashing can be salvaged and reprocessed.

The term "dynamically vulcanized alloy" (DVA) as used in the specification and claims means a composition comprising a crystalline polyolefin resin containing at least one rubber wherein substantially all of the rubber has been dynamically vulcanized to a fully cured state. The DVA compositions are prepared by blending together the polyolefin resin and rubber with cure systems and fillers under conditions of dynamic vulcanization.

The process for the production of the invention DVA is not restricted to single-batch type operations, as described above, wherein the rubbers are dynamically co-vulcanized with a cure system effective for both rubbers. Other embodiments include a two-step process wherein first one rubber is dynamically vulcanized to produce a dispersed micro-gel in the resin phase and thereafter the second rubber, if not originally present, is added and dynamically vulcanized. If both rubbers are initially present in the mix, then the cure systems added sequentially should be distinct so that first one and then the other rubber is vulcanized. If only one rubber is initially present, then the same cure system may be used when the second rubber is added, or a distinct cure system may be used to vulcanize the second rubber.

In yet a further embodiment, the three batch process, the rubbers are each individually dynamically vulcanized in separate blends which are then combined and mixed to form the invention TPO.

Finally, as a variant of the single batch process, instead of adding a single curing system effective for both rubbers, two distinct curing systems may be added and the rubbers may then be simultaneously dynamically vulcanized.

The term "rubber" as used in the specification and claims means any natural or synthetic polymer which can be vulcanized or cured so as to exhibit elastomeric properties.

The terms "primary" and "secondary" as used in relation to the rubbers of this invention do not indicate the relative importance or proportions of these rubbers in the blend but rather the terms are used as categories to distinguish between the rubbers.

The terms "EPM" and "EPDM" are used in the sense of their ASTM designations. EPM is an ethylene-propylene copolymer rubber which can be cross-linked by radiation curing or peroxide curing. EPDM is a terpolymer of ethylene, propylene and a non-conjugated diene. Illustrative non-limiting examples of suitable non-conjugated dienes are 5-ethylidene-2-norbornene (ENB); 1,4-hexadiene ; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; tetrahydroindene; methyltetrahydroindene; dicyclopentadiene; 5-isopropylidene-2-norbornene; 5-vinyl-norbornene; etc.

Butyl rubber is a copolymer of an isoolefin and a conjugated multiolefin. The useful rubber copolymers comprise a major portion of isoolefin and a minor amount, preferably not more than 30 wt. %, of a conjugated multiolefin. The preferred rubber copolymers comprise about 85-99.5 wt. % (preferably 95-99.5 wt. %) of a C-C isoolefin, such as isobutylene, and about 15-0.5 wt. % (preferably 5-0.5 wt. %) of a multiolefin of about 4-14 carbon atoms. These copolymers are referred to in the literature as "butyl rubber"; see for example, the textbook *Synthetic Rubber* by G. S. Whitby (1954 edition by John Wiley and Sons, Inc.) pp. 838-891. The term "butyl rubber" as used in the specification and claims includes the aforementioned copolymers of an isoolefin having 4-7 carbon atoms and about 0.5 to 20 wt. % of a conjugated multiolefin of about 4-10 carbon atoms. Preferably these copolymers contain about 0.5 to about 5% conjugated multiolefin. The preferred isoolefin is isobutylene. Suitable conjugated multiolefins include isoprene, butadiene, dimethyl butadiene, piperylene, etc. Commercial butyl rubber is a copolymer of isobutylene and minor amounts of isoprene.

The term "halogenated butyl rubber" as used in the specification and claims refers to butyl rubber as described above which has been halogenated with from about 0.1 to about 10, preferably, about 0.5 to about 3.0 wt. % chlorine or bromine. The chlorinated species of butyl rubber is commonly referred to as "chlorobutyl rubber" and the brominated species as "bromobutyl rubber."

Additionally, one or more uncured rubbers may be used in the practice of this invention. Illustrative, non-limiting examples of rubbers suitable for use in the practice of this invention include butyl rubber, halogenated butyl rubber, ethylene-propylene rubber (EPM), ethylene-propylene-diene rubber (EPDM), polyisoprene, polychloroprene, styrene-butadiene rubber, polybutene copolymers, nitrile rubbers, chloro-sulfonated polyethylene, etc. and mixtures thereof. While polyisobutylene is not a true rubber because it cannot be vulcanized, it can be utilized in the practice of this invention provided that it has a viscosity average molecular weight of from about 40,000 to about 1 million.

The preferred polyolefin resins are high density polyethylene (HDPE) and polypropylene. While other polyolefin homopolymers and copolymers of ethylene can be utilized in the practice of this invention, the resulting DVA compositions are deficient in high temperature characteristics. Such other polyolefins include low density polyethylene (LDPE), linear low density polyethylene (LLDPE) and polybutylene (PB), as well as copolymers of ethylene with vinyl acetate, acrylic acid, methyl acrylate, ethyl acrylate, ethylene-1 olefin copolymers (such as ethylene-butene and ethylene-hexene), etc. However, these other polyolefin resins can be incorporated into the DVA compositions of this invention along with the polypropylene ("PP") or polyethylene ("PE"). As used in the specification and claims, the term "polypropylene" includes homopolymers of propylene as well as reactor copolymers of polypropylene (RCPP) which can contain about 1 to about 20 wt. % ethylene or an alpha olefin comonomer of 4 to 16 carbon atoms, and mixtures thereof. The polypropylene can be highly crystalline isotactic or syndiotactic polypropylene. The RCPP can be either a random or block copolymer. The density of the PP or RCPP can be about 0.80 to about 0.9 g/cc; generally, about 0.89 to about 0.91 g/cc.

High density polyethylene (HDPE), useful as the polyolefin resin of this invention, has a density of about 0.941 to about 0.965 g/cc. High density polyethylene is an established product of commerce and its manufacture and general properties are well known to the art. Typically, HDPE has a relatively broad molecular weight distribution, characterized by the ratio of weight average molecular weight to number average molecular weight of from about 20 to about 40.

Polyolefin resins which can optionally be included in the compositions of this invention include polybutylene, LDPE and LLDPE as well as copolymers of ethylene with unsaturated esters of lower carboxylic acids. The term "polybutylene" generally refers to thermoplastic resins of both poly(1-butene)homopolymer and the copolymer with, for example, ethylene, propylene, pentene-1, etc. Polybutylene is manufactured via a stereospecific Ziegler-Natta polymerization of monomer(s). Commercially useful products are of high molecular weight and isotacticity. A variety of commercial grades of both homopolymer and ethylene copolymer are available with melt indices that range from about 0.3 to about 20 g/10 min.

The term "low density polyethylene" or "LDPE" as used in the specification and claims mean both low and medium density polyethylene having densities of about 0.910 to about 0.940 g/cc. The terms include linear polyethylene as well as copolymers of ethylene which are thermoplastic resins.

Linear low density polyethylene (LLDPE) is a class of low density polyethylene characterized by little, if any, long chain branching, in contrast to conventional LDPE. The processes for producing LLDPE are well known in the art and commercial grades of this polyolefin resin are available. Generally, it is produced in gas-phase fluidized bed reactors or liquid-phase solution process reactors; the former process can be carried out at pressures of about 100 to 300 psi and temperatures as low as 100° C.

The invention DVA includes compositions wherein the primary elastomer ranges from about 10 to about 90 wt. %, preferably about 15 to 85 wt. % and most preferably about 40 to 60 wt. % based upon the total weight of the elastomers.

The weight percent of the secondary elastomer may vary from about 90 to about 10 wt. %, preferably about 85 to 15 wt. % and most preferably about 60 to 40 wt. % based upon the weight of the elastomers.

The crystalline polyolefin content of the DVA may vary from about 10 wt. % to about 90 wt. % based upon the total weight of the elastomers and the crystalline polyolefin. However, it is preferred that the crystalline polyolefin content range from about 15 to 60 wt. %, most preferably from about 30 to 40 wt. % based upon the total weight of the elastomers and the crystalline polyolefin.

In addition to its polymer component, the DVA composition of this invention can include reinforcing and non-reinforcing fillers, antioxidants, stabilizers, rubber processing oils, lubricants (e.g., oleamide), antiblocking agents, antistatic agents, waxes, coupling agents for the fillers, foaming agents, pigments, flame retardants, and other processing aids known to the rubber compounding art. The pigments and fillers can comprise up to 50 wt. % of the total DVA composition based on polymer component plus additives; preferably pigments and fillers comprise about 0 to about 30 wt. % of the total composition.

Fillers can be inorganic fillers such as calcium carbonate, clays, silica, talc, titanium dioxide or carbon black. Any type of carbon black can be used, such as channel blacks, furnace blacks, thermal blacks, acetylene black, lamp black and the like.

Rubber process oils have particular ASTM designations depending on whether they fall into the class of paraffinic, naphthenic or aromatic process oils. They are derived from petroleum fractions. The type of process oil utilized will be that customarily used in conjunction with the rubber component. The ordinarily skilled rubber chemist will recognize which type of oil should be utilized with a particular rubber. The quantity of rubber process oil utilized is based on the total rubber content, both cured and uncured, and can be defined as the ratio, by weight, of process oil to the total rubber in the DVA. This ratio can vary from about 0 to about 1.5/1; preferably about 0.2/1 to about 1.00/1; more preferably about 0.3/1 to about 0.8/1. Larger amounts of process oil can be used, the resultant effect being reduced physical strength of the composition. Oils other than petroleum based oils, such as oils derived from coal tar and pine tar, can also be utilized. In addition to the petroleum derived rubber process oils, organic esters and other synthetic plasticizers can be used.

Antioxidants can be utilized in the composition of this invention—the particular antioxidant utilized will depend on the rubbers utilized and more than one type may be required. Their proper selection is well within the ordinary skill of the rubber processing chemist. Antioxidants will generally fall into the class of chemical protectors or physical protectors.

Physical protectors are used where there is to be little movement in the part to be manufactured from the composition. The physical antioxidants include mixed petroleum waxes and microcrystalline waxes. These generally waxy materials impart a "bloom" to the surface of the rubber part and form a protective coating to shield the part from oxygen, ozone, etc.

The chemical protectors generally fall into three chemical groups; secondary amines, phenolics and phosphites. Illustrative, non-limiting examples of types of antioxidants useful in the practice of this invention are hindered phenols, amino phenols, hydroquinones, alkyldiamines, amine condensation products, etc. Further non-limiting examples of these and other types of antioxidants are styrenated phenol; 2, 2'-methylene-bis (4-methyl-6-t-butylphenol); 2,6'-di-t-butyl-o-dimethylamino-p-cresol; hydroquinone monobenzyl ether; octylated diphenyl amine; phenyl-beta-naphthylamine; N,N'-diphenylethylene diamine; aldol-alpha-naphthylamine; N,N'-diphenyl-p-phenylene diamine; etc.

Any conventional cure system for the rubber to be dynamically vulcanized can be used. These include sulfur cures as well as non-sulfur cures. For example, halogenated butyl rubber can be cured using zinc oxide. Of course, accelerators such as dithiocarbamates or thiurams and thioureas can be included in these zinc oxide cures. Zinc oxide free cures of halogenated butyl rubber known to the art can also be utilized. For example, such cure systems comprise litharge, 2-mercaptoimidazoline and diphenyl guanidine.

Resin cure systems can be used for butyl rubber, halogenated butyl rubber and the EPDM rubbers. The resins useful in cure systems are phenolic resins, brominated phenolic resins, urethane resins, etc. The halogenated resin cure systems are generally metal activated where the rubber is butyl rubber or an EPDM.

While phenolic resin cures are suitable cures, they impart a yellowish or orangish tinge to the rubber part. For halogenated butyl rubber, a preferred cure system is one based on ZnO and MgO. Such cure systems permit the use of pigments such as TiO to give bright white compositions. In this system, the MgO acts not as an accelerator but as an acid acceptor to stabilize the rubber from dehydrohalogenation.

Organic peroxides may be used in the cure systems of the invention DVA except where the primary elastomer is butyl or chlorobutyl rubber, and preferred cure systems include peroxides where bromobutyl rubber is the primary elastomer. Specific examples of the useful organic peroxides are octanoyl peroxide, lauroyl peroxide, benzoyl peroxide, tert-butyl peroctoate, p-chlorobenzoyl peroxide, 2,4-dichlorobenzoyl peroxide, cyclohexanone peroxide, tert-butyl peroxybenzoate, methyl ethyl ketone peroxide, dicumyl peroxide, di-tert-butyl peroxide, 2,5-dimethyl-2,5-di(benzoylperoxy)hexane 2,5-dimethyl-2,5-di(tert-butylperoxy)hexane, di-tert-butyl diperoxyphthalate, tert-butylcumyl peroxide, diisopropylbenzene hydroperoxide, 1,3-bis(tert-butyl-peroxyisopropyl)benzene, tert-butyl peroxypivalate, 3,5,5-trimethylhexanoyl peroxide, 1,1-bis(tert-butyl-peroxy)-3,5,5-trimethylcyclohexane, 1,1-bis(tert-butyl-peroxy)cyclohexane, etc.; azo compounds such as azobisisbutyronitrile, etc.; and the like.

The peroxide-based cure systems may be used with or without co-agents such as sulfur, ethylene dimethacrylate, polyethylene glycol dimethacrylate, trimethylol propane trimethacrylate, divinyl benzene, diallyl itaconate, triallyl cyanurate, diallyl phthalate, allyl methacrylate, cyclohexyl methacrylate, m-phenylene bis maleimide (HVA-2), and the like.

When used to cure bromobutyl rubber in accordance with this invention, the peroxide-based cure systems should preferably be utilized with a co-agent or co-agents capable of enhancing the cure-state and inhibiting chain fragmentation or scission effects. Examples of such include specifically known maleimide compounds used as co-agent. The maleimide compound preferably used in the invention is a bismaleimide compound. Among the maleimide compounds, a bismaleimide compound is especially superior in effectiveness and m-phenylene bismaleimide (4,4'-m-phenylene bismaleimide) is preferred. Examples of the bismaleimide are 4,4'-vinylenediphenyl bismaleimide, p-phenylene bismaleimide, 4,4'-sulfonyldiphenyl bismaleimide, 2,2'-dithiodiphenyl bismaleimide, 4,4'-ethylene-bis-oxophenyl bismaleimide, 3'3-dichloro-4, 4'-biphenyl bismaleimide, o-phenylene bismaleimide, m-phenylene bismaleimide (HVA-2), hexamethylene bismaleimide and 3,6-durine bismaleimides. The maleimide compound will generally be used in an amount equal to about 1.0 to 10 parts per hundred parts of curable elastomer cured with either peroxide or non-peroxide curing systems. This range takes into account the use of certain maleimide compounds as co-agents or both peroxide cure systems and ZnO based cure systems when both are used.

Illustrative of accelerators which can be used in conjunction with ZnO for curing halobutyl rubber are 2,6-di-tert-butyl-para-cresol; N,N'-diethylthiourea; di-ortho-tolylguanidine; dipentamethylene thiuram tetrasulfide; ethylene trithiocarbonate; 2-mercapto-benzothiazole; benzothiazole disulfide; N-phenyl-beta-naphthylamine; tetramethyl thiuram disulfide, zinc diethyldithiocarbamate, zinc dibutyldithiocarbamate, and zinc dimethyldithiocarbamate. Formulations for the ZnO cure of halobutyl rubber are well known in the art. A preferred cure system comprises ZnO and m-phenylene bismaleimide since this system results in a vulcanized rubber with low compression set.

In the practice of this invention an uncured crystalline polyolefin resin is mixed with a halogenated butyl rubber and an EPM or EPDM rubber at a temperature sufficient to soften the resin or, more commonly, where the resin is crystalline at room temperature, to a temperature above its melting point. After the resin and rubbers are intimately mixed, the cure system is added. When chlorobutyl or butyl rubber forms part of the elastomeric component, a non-peroxide cure system should be used for curing the butyl or chlorobutyl rubber.

Peroxide cure systems may be effectively used to cure bromobutyl rubber-containing compositions, particularly when used with a maleimide compound as a co-agent. However, the use of peroxide curing systems is known to create problems for polyolefin resins. For example, polypropylene will undergo chain fragmentation or scission to some extent and polyethylene will tend also to undergo cross-linking reactions. Chain fragmentation or scission can be effectively suppressed by utilization of agents which accelerate the vulcanization of the rubber, for example the peroxide co-agents described above. Also suppression can be achieved by delaying the introduction of some part or portion of the polyolefin resin, generally less than about one half the total amount of polyolefin resin used. To best avoid excessive cross-linking of the polyolefin resin, it will comprise a significant portion of a polypropylene homo- or copolymer. By "significant portion" it is meant that at least about 12 wt. % polypropylene based upon the total weight of resin plus rubber is present. Thus where a peroxide curing system is utilized, the polyolefin resin will preferably be polypropylene or a mix of polypropylene with other olefin based resins.

Heating and masticating at vulcanization temperatures are generally adequate to complete vulcanization in about 0.5 to about 10 minutes. The vulcanization time can be reduced by elevating the temperature of vulcanization. A suitable range of vulcanization temperatures is from about the peak melting point of the resin (about 160° to 165° C. in the case of polypropylene) to about 250° C.; more typically, the temperature range is about 150° C. to about 230° C. Preferably the vulcanization is carried out at a temperature of about 180° C. to about 220° C.

It is preferred that the mixing process be continued until the vulcanization reactions are complete. If vulcanization reactions are permitted to continue after mixing has stopped, the composition will not be reprocessible as a thermoplastic. However, the dynamic vulcanization can be carried out in stages. For example, by the addition of a cure system specific to one of the elastomers during melt processing but after the vulcanization of the other elastomer. In another example, vulcanization can be commenced at high temperatures in a twin screw extruder and before vulcanization is complete pellets can be formed of the partially prepared DVA using an underwater pelletizer thereby quenching the curing step. At a later time vulcanization can be completed under dynamic vulcanization conditions, for example, a second curing system can be added to the pellets which can be subsequently melt processed. Furthermore, either elastomer may be independently dynamically vulcanized in a blend with a crystalline polyolefinic phase and the resultant blend may then be combined with the other elastomer, which may have been independently dynamically vulcanized or which may be dynamically vulcanized subsequently.

Those ordinarily skilled in the art will appreciate the appropriate quantities, types of cure systems and extent of mixing time required to carry out the vulcanization of the rubber. Where necessary the rubber can be vulcanized using varying amounts of cure system to determine the optimum cure system to be utilized and the appropriate cure conditions to obtain a full cure.

The term "fully vulcanized" as used in the specifications and claims with respect to the dynamically vulcanized rubber component of this invention means that the rubber component to be vulcanized has been cured to a state in which the elastomeric properties of the rubber are similar to those of the rubber in its conventional vulcanized state. The degree of cure of the vulcanized rubber can be described in terms of gel content or, conversely, extractable components. Alternatively, the degree of cure can be expressed in terms of cross-link density.

Where the determination of extractables is an appropriate measure of the state of cure, the improved thermoplastic elastomeric compositions are produced by vulcanizing the curable rubber component of the blends to the point where the composition contains no more than about four percent by weight of the cured rubber component extractable at room temperature by a solvent which dissolves the rubber which is intended to be vulcanized. The rubbers are preferably vulcanized to the point that the composition contains less than two percent by weight of extractables. In general, the less extractables in the cured rubber component, the better are the properties. Still more preferable are compositions comprising essentially no extractable rubber from the cured rubber phase (less than 0.5 wt. %).

Gel content reported as percent gel is determined by a procedure which comprises determining the amount of insoluble polymer by soaking the specimen for 48 hours in organic solvent at room temperature and then weighing the dried residue and making suitable corrections based upon knowledge of the composition. Thus, corrected initial and final weights are obtained by subtracting from the initial weight, the weight of soluble components, other than the rubber to be vulcanized, such as extender oils, plasticizers and components of the compositions soluble in organic solvent, as well as that rubber component of the DVA which it is not intended to cure. Any insoluble pigments, fillers, etc., are subtracted from both the initial and final weights.

To employ cross-link density as the measure of the state of cure which characterizes the improved thermoplastic elastomeric compositions, the blends are vulcanized to the extent which corresponds to vulcanizing the same rubber as in the blend statically under pressure in a mold with such amounts of the same cure systems as in the blend and under such conditions of time and temperature to give an effective cross-link density greater than about $3 \times 10$ moles per milliliter of rubber and preferably greater than about $5 \times 10$, or even more preferably, $1 \times 10$ moles per milliliter of rubber. The blend is then dynamically vulcanized under similar conditions with the same amount of cure system based on the rubber content of the blend as was required for the rubber alone. The cross-link density so determined may be regarded as a measure of the amount of vulcanization which produces the improved thermoplastics. However, it should not be assumed, from the fact that the amount of cure system is based on the rubber content of the blend and is that amount which gives the rubber alone the aforesaid cross-link density, that the cure system does not react with the resin or that there is no reaction between the resin and rubber. Highly significant reactions of limited extent may be involved. However, the assumption that the cross-link density determined as described provides a useful approximation of the cross-link density of the thermoplastic elastomeric compositions is consistent with the thermoplastic properties and with the fact that the large proportion of the resin can be removed from the composition by high temperature solvent extraction, for example, by boiling decalin extraction.

The cross-link density of the rubber is determined by equilibrium solvent swelling using the Flory-Rehner equation. *J. Rubber Chem. and Tech.* 30, p. 929. The appropriate Huggins solubility parameters for rubber-solvent pairs used in the calculation were obtained from the review article by Sheehan and Bisio, *J. Rubber Chem. & Tech.*, 39, 149. If the extracted gel content of the vulcanized rubber is low, it is necessary to use the correction of Bueche wherein the term "v" is multiplied by the gel fraction (% gel/100). The cross-link density is half the effective network chain density "v" determined in the absence of resin. The cross-link density of the vulcanized blends should therefore be understood to refer to the value determined on the same rubber as in the blend in the manner described. Still more preferred compositions meet both of the aforedescribed measures of state of cure, namely, by estimation of cross-link density and percent of rubber extractable.

The following examples serve to illustrate the process and product properties of the instant invention and are not intended to limit the scope of this invention.

EXAMPLE A

Two control DVA formulations were produced, one having only EPDM as the elastomer, sample 1, the other having bromobutyl rubber, sample 2. The compositions of these DVA-formulations are shown in Table IA and their physical properties in Table I. (Note that of the weight percent VISTALON 3777 used in Examples A, B, C, D and E 57 wt. % is EPDM and the remainder is oil. Thus, for instance, sample 1 effectively contains 28.5 wt. % EPDM and samples 3, 4, 5 and 6 contain 14.25 wt. % EPDM).

Sample 1 was prepared by mixing together all components, except the cure system and about one-half of the oil (not all oil was added so as to decrease mixing time) for about 4 minutes in a Banbury mixer while the temperature was increased to about 180° C. At that stage, the cure system was added while mixing continued. After a total of about 8 minutes had elapsed, the remainder of the oil was added while mixing. Two minutes later, the product was discharged from the Banbury, then sheeted out on an open mill and ground up for charge to an injection molding machine. Dumbbells were molded and their properties measured.

The bromobutyl blend formulation, sample 2, was prepared by a similar method. Dumbbells were made and tested.

The composition of invention samples 3, 4, 5, and 6 are also shown in Table IA.

In sample 3 the EPDM was cured first in the composition of sample 1. Thereafter the bromobutyl rubber and the remaining ingredients were added with the bromobutyl being subsequently cured to produce the final sample 3 DVA. The results of physical property tests on dumbbells of this DVA and those of samples 4, 5 and 6 are shown in Table I. The test procedures in measuring the physical properties of sample 3 and all the other samples, both control and invention, are identified in Table VIII.

In sample 4 the bromobutyl rubber was cured first in the composition of sample 2 and the EPDM and remaining ingredients added and cured second to produce a DVA product which was then tested.

In sample 5 the two rubbers were cured together and the DVA product tested.

In sample 6 the bromobutyl rubber and the EPDM rubber were each cured separately under conditions of dynamic vulcanization in blends which were then combined during melt processing to produce a DVA product which was tested.

The "control" samples serve as both controls representing commercial formulations such as, for instance, those of U.S. Pat. Nos. 4,130,535 and 4,311,628 to Monsanto, and also as base compositions from which invention compositions may be produced.

In all four invention samples, the tensile strength exceeded that of the bromobutyl-based sample 2 while being either comparable to that of the EPDM-based sample 1 or well within useful limitations thereof. Moreover, the invention samples' resistance to heat aging exceeded that of the EPDM-based control, sample 1.

EXAMPLE B

A series of tests similar to Example A were carried out using variations of formulations containing EPDM and chlorobutyl rubber with individual EPDM and chlorobutyl rubber containing blends as the control formulations, 1 and 7. The blend compositions are shown in Table IIA and the results of physical property tests on dumbbells of the DVA products are shown in Table II.

The results of this series of tests are similar to that of Example A.

EXAMPLE C

Blend formulations were produced at varying levels of bromobutyl rubber content using the method of sample 3. The compositions of these blends and test results on the DVA products are summarized in Table III. Sample 12 contained no bromobutyl rubber and provided an EPDM-based control DVA. Samples 13–15 contained from about a 60:40 to about a 85:15 ratio of bromobutyl to EPDM rubber.

The invention formulations containing a combination of bromobutyl and EPDM rubbers show benefits over the EPDM control. The tensile strength of the normally weaker butyl-based DVAs has increased to a level equal to or greater than that of the EPDM-based control DVA. Moreover, heat resistance of the invention DVAs are superior to that of the control and show useful levels of tensile strength and elongation even after 60 days at 150° C. in samples 14 and 15.

EXAMPLE D

Blend formulations with varying ratios of bromobutyl: EPDM rubber were tested in an experiment parallel to that of Example C but using a sulfur/sulfur donor cure system to cure the EPDM. The blend compositions and DVA product test results are shown in Table IV.

From the test results in Tables I and IV, it is apparent that use of a low sulfur/sulfur donor cure system for EPDM (sample 16) in place of a resin cure system (sample 1) results in lowered tensile strength in the all EPDM-based control. However, excellent synergistic results are obtained in the sulfur-cured invention formulations, samples 17, 18 and 19.

EXAMPLE E

In this series of blends, shown in Table V, the properties of the EPDM/bromobutyl rubber-based invention DVAs (samples 21, 22) are compared with two control DVAs. In one control DVA only bromobutyl rubber is used as the elastomeric phase (sample 20) while in the other a preformed EPDM composition which is not cured is added to the bromobutyl-based blend (sample 23). One of the invention DVAs, sample 22, includes a commercially-available EPDM DVA composition sold under the trade name SANTOPRENE.

The data for sample 21 confirms a previous result shown in Example C, namely that even a small amount of a compound containing dynamically vulcanized EPDM, when included in a dynamic vulcanizate containing a large amount of bromobutyl rubber, produces a product with improved tensile strength and excellent heat aging. Here the comparison is between sample 21, which is a DVA as described in sample 15 in Example C and sample 20, a control using only bromobutyl elastomer which is a DVA as described in sample 2 in Example A. In sample 22, the preformed EPDM dynamic vulcanizate was a commercial product, SANTOPRENE 201-73. SANTOPRENE 201-73 is believed to be very similar in composition to the EPDM composition shown in Table IA as sample 1 which was used to make sample 21, so the final composition may be expected to be similar and results are almost identical.

The control, sample 23, was made in the same manner as sample 21 except that the EPDM composition used as a starting ingredient was pre-mixed and not cured (it was like sample 1 in Examples A and B, but an additional 4.8 parts of the inert clay were substituted for the zinc oxide and SP 1056 curatives). There is some improvement relative to sample 20 but tensile, elongation and tear are below those of the claimed inventive compounds. Note that the composition of control compound sample 23 is taught in U.S. Pat. No. 4,607,074.

EXAMPLE F

Inventive compositions as described in Table VI were dynamically vulcanized in a Banbury mixer. In Sample 24 and sample 25, the rubbers were co-vulcanized with the addition of a single cure system. In Sample 24 the rubbers and PP COPOLYMER 7824 were mixed together with all the additives except for the cure system, wax and oil for about 6.5 minutes during which time the temperature was increased to about 180° C. During this mixing and heating time, the oil was added in three portions. At the end of this time, the SP 1056/SnCl$_2$ H$_2$O/ZnO cure system was added while mixing continued. After a total mixing time of about 13.5 minutes had elapsed, the wax was added while mixing. After about one minute, the blend was sheeted out onto an open mill and ground for charge to an injection molding machine. Dumbbells were injection molded from each of the blends and their properties were compared.

DVA sample 25 was prepared as above except that NEUTRAL 600 oil was used in the blend as an additive instead of SUNPAR 2280.

In preparing the blend of sample 26, the polymer, rubber and additives were mixed for about 11 minutes while heating to over 170° C. before the cure system co-agent HVA-2 was added. About one minute later, the ZnO was added and about 4 minutes thereafter, the SP 1056/SnCl$_2$ H$_2$O was added. After about 6 minutes when dynamic vulcanization was complete, the wax was added and one minute later the blend was sheeted out onto an open mill.

In preparing the blend of sample 27, the polymer, rubber and additives were blended as for sample 26 except that the HVA-2 was added after about 10.5 minutes of mixing, the ZnO about one minute later, the resin and SP 1056/SnCl$_2$ H$_2$O four minutes later and the wax 3 minutes thereafter. After a further one minute of mixing, the blend was sheeted out onto an open mill.

Comparative samples 28, 29 and 30 are commercially available DVAs which the inventors believe are EPDM-based and which are sold by MONSANTO CHEMICAL COMPANY (St. Louis, Mo.) under the trade names SANTOPRENE 201-64, SANTOPRENE 201-73 and SANTOPRENE 201-80, respectively.

Comparing samples 24 and 25, it is apparent that a change in the type of oil used has some effect and that the NEUTRAL 600-containing DVA (sample 25) has a somewhat reduced percentage elongation and tensile strength as compared to the SUNPAR-containing DVA (sample 24).

A comparison of the invention blends, 24, 25, 26, and 27 with the commercially available DVAs of samples 28, 29 and 30 shows the superiority of the invention DVAs' tensile strength.

EXAMPLE G

DVA samples were prepared in a Banbury mixer using peroxide as part of the cure system. The composition and properties of these DVAs are shown in Table VII.

In sample 31, the rubbers and polypropylene were mixed together with all additives (except antioxidants, cure system and wax) for about 5 minutes at 180° C. Oil was added in 3 portions during these 5 minutes of mixing. At this stage, the entire cure system was added while mixing continued. After a total mixing time of about 14 minutes, wax and antioxidants were added, while mixing continued. About 2 minutes later, the sample was sheeted out onto an open mill and ground up for charge into an injection-molding machine. Samples were die cut from injection-molded plates for physical property measurements.

Sample 32 was prepared in the same way as sample 31, except that ZnO/HVA-2 were added first after about 6 minutes of mixing at 180° C., then about 1 minute later, after at least partial curing of the bromobutyl rubber, peroxide was added.

Sample 33 was prepared in the same way as sample 31, except that the ZnO and one-third of the HVA-2 were added after about 6 minutes of mixing at 180° C. After about 12 minutes of mixing, when the bromobutyl rubber was fully cured, the sample was sheeted out onto an open mill then ground up. This sample was tumbled with two-thirds of the HVA-2 and peroxide and then remixed in a Banbury mixer at 180° C. for about 9 minutes. Wax and antioxidants were added during the remix, 2 minutes before dumping.

Sample 34 was produced using an EPDM, VISTALON 3666 as the cured rubber, while sample 35 contained bromobutyl 2244 as the cured rubber.

Sample 34 was produced by mixing polymers and additives including HVA-2, for about 9 minutes at 180° C. during which time the oil was added in 2 portions. At this stage, peroxide was added and the EPDM rubber was dynamically vulcanized. After a total mixing time of about 17 minutes, wax and antioxidants were added and 2 minutes later sample was dumped, sheeted out and ground up for test sample production.

Sample 35 was produced by mixing polymers and additives for about 9 minutes at 180° C. during which time the oil was added in 3 portions. At this stage, HVA-2/ZnO was added and the bromobutyl rubber was dynamically vulcanized. After a total mixing time of about 20 minutes, wax and antioxidants were added and 2 minutes later sample was dumped, sheeted out and ground up for test sample production.

Sample 37 was produced in the same way as sample 35, except that sample 37 contained 5% uncured VISTALON 808.

Samples 36 and 38 were prepared by the three-blend embodiment of the present invention. Two individual dynamically vulcanized blends were produced which were then blended during melt processing into a single dynamically vulcanized blend.

Sample 36 was produced by mixing samples 34 and 35 in a 50/50 proportion at 180° C. for about 6 minutes.

Sample 38 was produced by mixing samples 34 and 37 in a 50/50 proportion at 180° C. for about 6 minutes.

The difference in properties between samples 31-33 illustrate the effect of their production processes. Sample 31, having the lowest tensile strength and percentage elongation of the trio, was prepared in a single batch operation wherein the elastomers were all cured together by the one-step addition of the cure system. Sample 32, the DVA having intermediate percentage elongation and tensile strength, was prepared by first partially curing the bromobutyl rubber before adding the peroxide cure. Finally, sample 33, the DVA with the best percentage elongation and tensile strength was prepared by first fully curing the bromobutyl rubber before adding the peroxide cure.

Samples 34-38 illustrate the superiority of the invention DVAs which contain both a bromobutyl rubber and an EPDM rubber over the prior art DVAs which contain only one of these rubbers. Thus, for instance, sample 36 which is an invention blend, has superior tensile strength and percentage elongation with respect to its component single-rubber DVAs, samples 34 and 35. Similarly, invention DVA sample 38 has superior percentage elongation and tensile strength to samples 34 and 37.

TABLE I

Dynamically Vulcanized Bromobutyl/EPDM Formulations

| Compound | CONTROLS | | INVENTION Formulations Combining Bromobutyl and EPDM | | | |
|---|---|---|---|---|---|---|
| | EPDM 1 | Bromobutyl 2 | EPDM Cured 1st 3 | Bromobutyl Cured 1st 4 | Cured Together 5 | Cured Separately Blended 6 |
| FLOW PROPERTIES | | | | | | |
| Spiral Flow, cm | 15 | 16.5 | 19 | 17 | 18 | 16.5 |
| MFR @ 230° C., 10 Kg | 0.5 | 31 | 2 | 16 | 14 | 14 |
| PHYSICAL PROPERTIES | | | | | | |
| Injection Molded, Die Cut Dumbbells: | | | | | | |
| Hardness, Shore A, 10 sec. | 68 | 69 | 68 | 69 | 67 | 64 |
| 100% Modulus, psi | 520 | 480 | 490 | 440 | 480 | 450 |
| Tensile Strength, psi | 1130 | 900 | 1160 | 990 | 1000 | 1100 |
| Elongation, % | 410 | 280 | 350 | 380 | 300 | 380 |
| Tear Strength, Die B, pli | 230 | 220 | 220 | 220 | 220 | 213 |
| THERMAL STABILITY | | | | | | |
| Compression Set B, % | | | | | | |
| 22 Hr. @ 100° C. | 46 | 40 | 41 | 51 | 50 | 45 |
| 22 Hr. @ 150° C. | 70 | 68 | 69 | not tested | not tested | 70 |
| High Temperature Aging: | | | | | | |
| Air Oven Aging, 14 days @ 150° C. | | | | | | |
| Hardness Change, Points | +3 | +1 | +2 | +1 | 0 | +6 |
| % Tensile Retained | 76 | 107 | 108 | 118 | 138 | 111 |

TABLE I-continued

Dynamically Vulcanized Bromobutyl/EPDM Formulations

| | CONTROLS | | INVENTION Formulations Combining Bromobutyl and EPDM | | | |
|---|---|---|---|---|---|---|
| | EPDM | Bromobutyl | EPDM Cured 1st | Bromobutyl Cured 1st | Cured Together | Cured Separately Blended |
| Compound | 1 | 2 | 3 | 4 | 5 | 6 |
| % Elongation Retained | 59 | 93 | 83 | 88 | 112 | 73 |
| Air Oven Aging, 30 days @ 150° C. | | | | | | |
| Hardness Change, Points | +9 | −3 | −1 | −1 | −4 | 0 |
| % Tensile Retained | 18 | 98 | 83 | 102 | 102 | 81 |
| % Elongation Retained | Brittle | 75 | 60 | 72 | 91 | 56 |
| ASTM #3 Oil, 70 Hr. @ 100° C. | | | | | | |
| Volume Swell, % | 83 | 77 | 82 | 105 | 102 | 88 |
| PROPORTIONS Ratio of Bromobutyl to EPDM | 0:100 | 100:0 | 59.5:40.5 | 59.5:40.5 | 59.5:40.5 | 59.5:40.5 |

TABLE IA

| CONTROLS | | | | INVENTION | |
|---|---|---|---|---|---|
| EPDM Formulation, 1 | | Bromobutyl Formulation, 2 | | Formulations 3, 4, 5, 6, with Two Elastomers | |
| Vistalon 3777 (EPDM: Oil 57:43) | 50.0 | Bromobutyl 2244 | 42.0 | Vistalon 3777 | 25.0 |
| Sunolite 127 Wax | 1.5 | Maglite D | 0.5 | Bromobutyl 2244 | 21.0 |
| PP 5052 | 16.7 | PP 5052 | 18.0 | Maglite D Magnesium Oxide | 0.3 |
| Nucap 190 Clay | 8.2 | Nucap 190 Clay | 3.5 | PP 5052 Polypropylene | 17.35 |
| Titanox 2071 | 1.0 | Titanox 2071 | 3.0 | Nucap 190 Clay | 5.8 |
| Stearic Acid | 0.5 | Stearic Acid | 0.5 | Titanox 2071 | 2.0 |
| Sunpar 150 Oil | 16.0 | Sunpar 150 Oil | 28.0 | Sunolite 127 Wax | 0.75 |
| Irganox 3114 | 0.5 | Vanox MTI | 0.5 | Stearic Acid | 0.45 |
| Ultranox 626 | 0.8 | Protox 169 ZnO | 3.0 | Sunpar 150 Oil | 22.0 |
| Protox 169 ZnO | 0.8 | HVA-2 | 1.0 | Vanox MTI | 0.3 |
| SP 1056 Resin | 4.0 | | | Irganox 3114 | 0.25 |
| | | | | Protox 169 Zinc Oxide | 1.9 |
| | | | | SP 1056 Resin | 2.0 |
| | | | | HVA-2 | 0.5 |
| | 100.00 | | 100.00 | | 100.00 |

TABLE II

Dynamically Vulcanized Chlorobutyl/EPDM Formulations

| | CONTROL Formulations | | INVENTION Formulations Combining Chlorobutyl and EPDM | | | |
|---|---|---|---|---|---|---|
| | EPDM | Chlorobutyl | EPDM Cured 1st | Chlorobutyl Cured 1st | Cured Together | Cured Separately Blended |
| | 1 | 7 | 8 | 9 | 10 | 11 |
| FLOW PROPERTIES | | | | | | |
| Spiral Flow, cm | 15 | 15.5 | 15.5 | 19.5 | 15.5 | 14 |
| MFR @ 230° C., 10 Kg | 0.5 | 8.9 | 1.4 | 2.6 | 1.1 | 0.9 |
| PHYSICAL PROPERTIES Injection Molded, Die Cut Dumbbells: | | | | | | |
| Hardness, Shore A, 10 sec. | 68 | 67 | 67 | 69 | 69 | 62 |
| 100% Modulus, psi | 520 | 480 | 480 | 470 | 480 | 460 |
| Tensile Strength, psi | 1130 | 960 | 1010 | 1000 | 1000 | 1100 |
| Elongation, % | 410 | 300 | 330 | 380 | 360 | 420 |
| Tear Strength, Die B, pli | 230 | 210 | 200 | 210 | 210 | 210 |
| THERMAL STABILITY Compression Set B, % | | | | | | |
| 22 Hr. @ 100° C. | 46 | 42 | 48 | 58 | 52 | 57 |
| 22 Hr. @ 150° C. | 70 | 59 | 65 | not tested | not tested | not tested |
| High Temperature Aging: Air Oven Aging, 14 days @ 150° C. | | | | | | |
| Hardness Change, Points | +3 | 0 | 0 | +1 | −2 | +6 |
| % Tensile Retained | 76 | 77 | 98 | 99 | 95 | 84 |
| % Elongation Retained | 59 | 71 | 57 | 64 | 62 | 46 |
| Air Oven Aging, 30 days @ 150° C. | | | | | | |
| Hardness Change, Points | +9 | −2 | 0 | −1 | −1 | +4 |
| % Tensile Retained | 18 | 69 | 56 | 64 | 68 | 57 |
| % Elongation Retained | Brittle | 47 | 32 | 33 | 43 | 30 |
| ASTM #3 Oil, 70 Hr. @ 100° C. Volume Swell, % | 83 | 102 | 96 | 124 | 103 | 109 |
| PROPORTIONS Ratio of Chlorobutyl to EPDM | 0:100 | 100:0 | 59.5:40.5 | 59.5:40.5 | 59.5:40.5 | 59.5:40.5 |

TABLE IIA

| CONTROL FORMULATIONS | | | | INVENTION | |
|---|---|---|---|---|---|
| EPDM Formulation, 1 | | Chlorobutyl Formulation, 7 | | Formulations 8, 9, 10, 11, with Two Elastomers | |
| Vistalon 3777 (EPDM: Oil 57:43) | 50.0 | Chlorobutyl 1068 | 42.0 | Vistalon 3777 | 25.0 |
| Sunolite 127 Wax | 1.5 | Maglite D | 0.5 | Chlorobutyl 1068 | 21.0 |
| PP 5052 | 16.7 | PP 5052 | 19.0 | Maglite D | 0.3 |
| Nucap 190 Clay | 8.2 | Titanox 2071 | 3.2 | Sunolite 127 Wax | 0.7 |
| Titanox 2071 | 1.0 | Stearic Acid | 0.5 | PP 5052 | 17.9 |
| Stearic Acid | 0.5 | Sunpar 150 Oil | 27.0 | Nucap 190 Clay | 4.1 |
| Sunpar 150 Oil | 16.0 | Irganox 3114 | 0.5 | Titanox 2071 | 2.0 |
| Irganox 3114 | 0.5 | Ultranox 626 | 0.8 | Stearic Acid | 0.5 |
| Ultranox 626 | 0.8 | Protox 169 ZnO | 3.5 | Sunpar 150 Oil | 21.5 |
| Protox 169 ZnO | 0.8 | SP 1056 Resin | 3.0 | Irganox 3114 | 0.5 |
| SP 1056 Resin | 4.0 | | | Ultranox 626 | 0.8 |
| | | | | Protox 169 ZnO | 2.2 |
| | | | | SP 1056 Resin | 3.5 |

TABLE III

Effect of Elastomer Blend Ratio: Bromobutyl/EPDM

| | CONTROL | INVENTION | | |
|---|---|---|---|---|
| | 12 | 13 | 14 | 15 |
| Vistalon 3777 (EPDM: Oil 57:43) | 50 | 25 | 15 | 10 |
| Bromobutyl 2244 | — | 21 | 29.4 | 33.6 |
| Maglite D Magnesium Oxide | — | 0.3 | 0.4 | 0.4 |
| PP 5052 Polypropylene | 16.7 | 17.35 | 17.61 | 17.74 |
| Nucap 190 Clay | 8.2 | 5.8 | 4.96 | 4.44 |
| Titanox 2071 | 1.0 | 2.0 | 2.4 | 2.6 |
| Sunolite 127 Wax | 1.5 | 0.75 | 0.45 | 0.3 |
| Stearic Acid | 0.5 | 0.45 | 0.45 | 0.5 |
| Sunpar 150 Oil | 16.0 | 22.0 | 24.4 | 25.6 |
| Vanox MTI | — | 0.3 | 0.3 | 0.4 |
| Irganox 3114 | 0.5 | 0.25 | 0.15 | 0.1 |
| Ultranox 626 | 0.8 | 0.4 | 0.24 | 0.16 |
| Protox 169 Zinc Oxide | 0.8 | 1.9 | 2.34 | 2.56 |
| SP 1056 Resin | 4.0 | 2.0 | 1.2 | 0.8 |
| HVA-2 | — | 0.5 | 0.7 | 0.8 |
| PROPORTIONS | | | | |
| % of pre-formed dynamically vulcanized EPDM compound (12) used as a masterbatch in the final compound | — | 50% | 30% | 20% |
| Ratio of Bromobutyl to EPDM | 0:100 | 59.5:40.5 | 77.4:22.6 | 85.5:14.5 |
| FLOW PROPERTIES | | | | |
| Spiral Flow, cm | 21 | 23 | 23 | 23 |
| PHYSICAL PROPERTIES | | | | |
| Injection Molded, Die Cut Dumbbells: | | | | |
| Hardness, Shore A, Inst./10 sec. | 70/67 | 70/67 | 70/67 | 69/66 |
| 100% Modulus, psi | 460 | 460 | 460 | 460 |
| Tensile Strength, psi | 1020 | 1090 | 1040 | 1040 |
| Elongation, % | 460 | 350 | 320 | 320 |
| Tear Strength, Die B, pli | 170 | 140 | 120 | 130 |
| THERMAL STABILITY | | | | |
| Compression Set B, % 22 Hr. @ 100° C. | 63 | 44 | 41 | 38 |
| High Temperature Aging: | | | | |
| Air Oven Aging, 2 Wks. @ 150° C. | | | | |
| Hardness Change, Points | +8 | +3 | +1 | +2 |
| % Tensile Retained | 55 | 102 | 96 | 97 |
| % Elongation Retained | 9 | 91 | 90 | 97 |
| Air Oven Aging, 4 Wks. @ 150° C. | | | | |
| Hardness Change, Points | +24 | +5 | +3 | +3 |
| % Tensile Retained | 49 | 92 | 90 | 95 |
| % Elongation Retained | 0.2 | 75 | 74 | 86 |
| Air Oven Aging, 45 Days @ 150° C. | | | | |
| Hardness Change, Points | +5 | +8 | +4 | +1 |
| % Tensile Retained | 51 | 66 | 84 | 81 |
| % Elongation Retained | 0 | 47 | 80 | 80 |
| Air Oven Aging, 60 days @ 150° C. | | | | |
| Hardness Change, Points | +5 | +8 | +4 | +4 |
| % Tensile Retained | 27 | 47 | 77 | 74 |
| % Elongation Retained | 0 | 22 | 61 | 67 |
| ASTM #3 Oil, 70 Hr. @ 100° C. | | | | |
| Volume Swell, % | 123 | 97 | 87 | 88 |
| % Tensile Retained | 45 | 55 | 62 | 49 |
| % Elongation Retained | 36 | 44 | 53 | 37 |

TABLE IV

Effect of Elastomer Blend Ratio, Bromobutyl:EPDM

| | CONTROL | INVENTION | | |
|---|---|---|---|---|
| | 16 | 17 | 18 | 19 |
| Vistalon 3777 (EPDM: Oil 57:43) | 50 | 25 | 15 | 10 |
| Bromobutyl 2244 | — | 21 | 29.4 | 33.6 |
| Maglite D Magnesium Oxide | — | 0.3 | 0.4 | 0.4 |
| PP 5052 Polypropylene | 16.7 | 17.35 | 17.61 | 17.74 |
| Nucap 190 Clay | 8.8 | 6.1 | 5.14 | 4.56 |
| Titanox 2071 | 1.0 | 2.0 | 2.4 | 2.6 |
| Sunolite 127 Wax | 1.5 | 0.75 | 0.45 | 0.3 |
| Stearic Acid | 0.5 | 0.45 | 0.45 | 0.5 |
| Sunpar 150 Oil | 16.0 | 22.0 | 24.4 | 25.6 |
| Vanox MTI | — | 0.3 | 0.3 | 0.4 |
| Irganox 3114 | 0.5 | 0.25 | 0.15 | 0.1 |
| Ultranox 626 | 0.8 | 0.4 | 0.24 | 0.16 |
| Protox 169 Zinc Oxide | 3.0 | 3.0 | 3.0 | 3.0 |
| Sulfur | 0.2 | 0.1 | 0.06 | 0.04 |
| DPTTS | 0.4 | 0.2 | 0.12 | 0.08 |
| MBT | 0.6 | 0.3 | 0.18 | 0.12 |
| HVA-2 | — | 0.5 | 0.7 | 0.8 |
| PROPORTIONS | | | | |
| % of pre-formed dynamically vulcanized EPDM compound (16) used as a masterbatch in the final compound | — | 50% | 30% | 20% |
| Ratio of Bromobutyl to EPDM | 0:100 | 59.5:40.5 | 77.4:22.6 | 85.5:14.5 |
| FLOW PROPERTIES | | | | |
| Spiral Flow, cm | 19 | 26 | 24 | 24 |
| PHYSICAL PROPERTIES | | | | |
| Injection Molded, Die Cut Dumbbells: | | | | |
| Hardness, Shore A, Inst./10 sec. | 70/67 | 70/66 | 69/65 | 64/64 |
| 100% Modulus, psi | 810 | 980 | 900 | 1030 |
| Tensile Strength, psi | | | | |
| Elongation, % | 350 | 330 | 280 | 290 |
| Tear Strength, Die B, pli | 170 | 120 | 120 | 120 |
| THERMAL STABILITY | | | | |
| Compression Set B, % | 43 | 33 | 35 | 33 |
| 22 Hr. @ 100° C. | | | | |
| High Temperature Aging: | | | | |
| Air Oven Aging, 2 Wks. @ 150° C. | | | | |
| Hardness Change, Points | +3 | +2 | +5 | +5 |
| % Tensile Retained | 123 | 100 | 110 | 85 |
| % Elongation Retained | 91 | 84 | 96 | 82 |
| Air Oven Aging, 4 Wks. @ 150° C. | | | | |
| Hardness Change, Points | +6 | +2 | +3 | +5 |
| % Tensile Retained | 102 | 104 | 104 | 94 |
| % Elongation Retained | 40 | 80 | 84 | 83 |
| Air Oven Aging, 6 Wks. @ 150° C. | | | | |
| Hardness Change, Points | +18 | +9 | +9 | +11 |
| % Tensile Retained | 36 | 76 | 70 | 96 |
| % Elongation Retained | 0.6 | 49 | 93 | 95 |
| ASTM #3 Oil, 70 Hr. @ 100° C. | | | | |
| Volume Swell, % | 94 | 82 | 79 | 79 |
| % Tensile Retained | 65 | 58 | 72 | 61 |
| % Elongation Retained | 46 | 42 | 56 | 50 |

TABLE V

DVAs With a Minor Amount of Pre-formed Dynamically Vulcanized EPDM Contrasted with DVAs Containing Bromobutyl Only or Bromobutyl Plus Uncured EPDM

| | CONTROL only Bromobutyl | INVENTION: DVA with Bromobutyl plus a pre-formed dynamically vulcanized EPDM composition | | CONTROL with Bromobutyl and a pre-formed uncured EPDM |
|---|---|---|---|---|
| | 20 | 21 | 22 | 23 |
| Bromobutyl 2244 | 42 | 33.6 | 33.6 | 33.6 |
| Dynamically vulcanized EPDM composition | — | 20 | — | — |
| Santoprene 201-73 | — | — | 20 | — |
| EPDM composition | — | — | — | 20 |
| Maglite D Magnesium Oxide | 0.5 | 0.4 | 0.4 | 0.4 |
| PP 5052 Polypropylene | 18 | 14.4 | 14.4 | 14.4 |
| Nucap 190 Clay | 3.5 | 2.8 | 2.8 | 2.8 |
| Titanox 2071 | 3.0 | 2.4 | 2.4 | 2.4 |
| Sunolite 127 Wax | — | — | — | — |
| Stearic Acid | 0.5 | 0.4 | 0.4 | 0.4 |
| Sunpar 150 Oil | 28 | 22.4 | 22.4 | 22.4 |
| Vanox MTI | 0.5 | 0.4 | 0.4 | 0.4 |
| Irganox 3114 | — | — | — | — |
| Ultranox 626 | — | — | — | — |

TABLE V-continued

DVAs With a Minor Amount of Pre-formed Dynamically Vulcanized EPDM Contrasted with DVAs Containing Bromobutyl Only or Bromobutyl Plus Uncured EPDM

|  | CONTROL only Bromobutyl | INVENTION: DVA with Bromobutyl plus a pre-formed dynamically vulcanized EPDM composition | | CONTROL with Bromobutyl and a pre-formed uncured EPDM |
|---|---|---|---|---|
|  | 20 | 21 | 22 | 23 |
| Protox 169 Zinc Oxide | 3.0 | 2.4 | 2.4 | 2.4 |
| HVA-2 | 1.0 | 0.8 | 0.8 | 0.8 |
| PROPORTIONS | | | | |
| % of pre-formed dynamically vulcanized EPDM composition used as a masterbatch in the final compound | — | 20% | 20% | None (20% of non-vulcanized EPDM composition added) |
| Ratio of Bromobutyl to EPDM | 100:0 | 85.5:14.5 | unknown | 85.5:14.5 |
| FLOW PROPERTIES | | | | |
| Spiral Flow, cm | 26 | 24.5 | 26 | 30 |
| PHYSICAL PROPERTIES | | | | |
| Injection Molded, Die Cut Dumbbells: | | | | |
| Hardness, Shore A, Inst./10 sec. | 70/65 | 70/64 | 71/65 | 72/67 |
| 100% Modulus, psi | 580 | 620 | 580 | 580 |
| Tensile Strength, psi | 860 | 1130 | 1050 | 960 |
| Elongation, % | 230 | 290 | 280 | 250 |
| Tear Strength, pli | 120 | 140 | 140 | 130 |
| THERMAL STABILITY | | | | |
| Compression Set B, % 22 Hr. @ 100° C. | 42 | 41 | 42 | 44 |
| High Temperature Aging: | | | | |
| Air Oven Aging, 2 Wks. @ 150° C. | | | | |
| Hardness Change, Points | +1 | −3 | +2 | 0 |
| % Tensile Retained | 81 | 88 | 85 | 98 |
| % Elongation Retained | 71 | 87 | 81 | 99 |
| Air Oven Aging, 4 Wks. @ 150° C. | | | | |
| Hardness Change, Points | +6 | +7 | +9 | +5 |
| % Tensile Retained | 74 | 81 | 83 | 96 |
| % Elongation Retained | 65 | 79 | 78 | 102 |
| Air Oven Aging, 8 Wks. @ 150° C. | | | | |
| Hardness Change, Points | +8 | +8 | +11 | +7 |
| % Tensile Retained | 42 | 57 | 75 | 77 |
| % Elongation Retained | 27 | 48 | 79 | 91 |
| ENVIRONMENTAL RESISTANCE | | | | |
| ASTM #3 Oil, 70 Hr. @ 100° C. | | | | |
| Volume Swell, % | 68 | 82 | 69 | 82 |
| % Tensile Retained | 56 | 61 | 60 | 60 |
| % Elongation Retained | 68 | 53 | 52 | 55 |

TABLE VI

DVA BLENDS HAVING EPDM:BROMOBUTYL 50:50

|  | 24 | 25 | 26 | 27 | DVA Based on EPDM 28 | DVA Based on EPDM 29 | DVA Based on EPDM 30 |
|---|---|---|---|---|---|---|---|
| Vistalon 3666 (EPDM:oil 57:43) | 26.25 | 26.25 | — | 26.25 | | | |
| Vistalon 6630 (EPDM:oil 77:23) | — | — | 19.50 | — | | | |
| Bromobutyl 2244 | 15.00 | 15.00 | 15.00 | 15.00 | | | |
| Black Carbon SRF 762 | 10.43 | 10.43 | 9.90 | 10.03 | | | |
| PP Copolymer 7824 | 15.40 | 15.40 | 15.40 | 15.40 | | | |
| Neutral 600 Oil | — | 23.57 | — | — | | | |
| Sunpar 2280 Oil | 23.57 | — | 30.45 | 23.57 | | | |
| Ultranox 626 | 0.05 | 0.05 | 0.05 | 0.05 | | | |
| Irganox 1010 | 0.20 | 0.20 | 0.20 | 0.20 | | | |
| Wax Antilux | 1.60 | 1.60 | 1.00 | 1.00 | | | |
| Maglite D | 0.20 | 0.20 | 0.20 | 0.20 | | | |
| Stearic Acid | 0.40 | 0.40 | 0.40 | 0.40 | | | |
| Zinc Oxide | 3.00 | 3.00 | 3.00 | 3.00 | | | |
| HVA 2 | — | — | 1.00 | 1.00 | | | |
| SP 1056 | 3.30 | 3.30 | 3.30 | 3.30 | | | |
| SnCl$_2$.H$_2$O | 0.60 | 0.60 | 0.60 | 0.60 | | | |
| Physical Properties On Die Cut Samples | | | | | | | |
| Hardness, Shore A - Instant. | 76 | 71 | 73 | 73 | 61 | 70 | 78 |
| 5" | 67 | 68 | 70 | 70 | 57 | 67 | 76 |
| 30" | 65 | 66 | 67 | 68 | 55 | 65 | 74 |
| 100% Modulus, psi | 406 | 414 | 420 | 414 | 239 | 392 | 479 |
| Tensile Strength, psi | 980 | 950 | 936 | 1016 | 464 | 697 | 805 |
| Elongation, % | 330 | 307 | 306 | 324 | 270 | 284 | 323 |
| Tear Strength, Die C, pli | 160 | 147 | 140 | 141 | 114 | 138 | 165 |
| Compression Set B, % at 100° C. | 39 | 38 | 42 | 39 | 30 | 34 | 40 |
| Injection-Moulded | good | good | good | good | trace | good | good |

TABLE VI-continued

DVA BLENDS HAVING EPDM:BROMOBUTYL 50:50

|  | 24 | 25 | 26 | 27 | DVA Based on EPDM 28 | DVA Based on EPDM 29 | DVA Based on EPDM 30 |
|---|---|---|---|---|---|---|---|
| Plates Surface Quality |  |  |  |  | imperfections |  |  |
| Ratio of Bromobutyl Rubber to EPDM | 50:50 | 50:50 | 50:50 | 50:50 |  |  |  |

TABLE VII

|  | 31 | 32 | 33 | 34 | 35 | 36 | 37 | 38 |
|---|---|---|---|---|---|---|---|---|
| Vistalon 3666 (EPDM:oil 57:43) | 26.80 | 26.80 | 26.80 | 52.35 | — | 50/50 blend of 34 and 35 | — | 50/50 blend of 34 and 37 |
| Bromobutyl 2244 | 15.30 | 15.30 | 15.30 | — | 31.00 | | 31.00 | |
| Vistalon 808 | — | — | — | — | — | | 5.00 | |
| PP PPH 1050 | 15.72 | 15.80 | 15.80 | 15.40 | 16.90 | | 16.90 | |
| SRF 762 | 10.30 | 10.90 | 10.90 | 10.30 | 12.55 | | 7.55 | |
| Sunpar 2280 Oil | 23.00 | 23.00 | 23.00 | 12.00 | 35.20 | | 35.20 | |
| Ultranox 626 | 0.05 | 0.10 | 0.10 | 0.05 | 0.05 | | 0.05 | |
| Irganox 1010 | 0.20 | 0.20 | 0.20 | 0.20 | 0.20 | | 0.20 | |
| Wax Antilux | 1.60 | 1.60 | 1.60 | 1.60 | 1.60 | | 1.60 | |
| Maglite D | 0.20 | 0.20 | 0.20 | 0.20 | 0.20 | | 0.70 | |
| Stearic Acid | 0.40 | 0.40 | 0.40 | 0.40 | 0.40 | | 0.40 | |
| Zinc Oxide | 3.00 | 3.00 | 3.00 | 2.65 | 1.50 | | 1.50 | |
| HVA-2 | 2.40 | 2.40 | 1.50 | 2.57 | 0.30 | | 0.30 | |
| Perkadox 14/40 Peroxide | 1.00 | 0.40 | 0.20 | 1.80 | — | | — | |
| Physical Properties On Die Cut Samples | | | | | | | | |
| Hardness, Shore A - Instant. | 76 | 76 | 76 | 70 | 72 | 71 | 72 | 70 |
| 5" | 73 | 73 | 73 | 67 | 67 | 66 | 67 | 64 |
| 30" | 71 | 71 | 71 | 65 | 64 | 64 | 64 | 62 |
| 100% Modulus, psi | 460 | 508 | 450 | 392 | 385 | 392 | 385 | 348 |
| Tensile Strength, psi | 710 | 827 | 926 | 740 | 675 | 856 | 675 | 791 |
| Elongation, % | 207 | 224 | 333 | 235 | 217 | 280 | 271 | 330 |
| Tear Strength, Die C, pli | 155 | 166 | 160 | 143 | 109 | 132 | 160 | 155 |
| Compression Set B, % at 23° C. | 22 | 23 | 27 | 20 | 23 | 20 | 26 | 22 |
| 100° C. | 38 | 41 | 44 | 37 | 41 | 40 | 40 | 40 |
| Ratio of Bromobutyl Rubber to Crosslinked EPDM | 50:50 | 50:50 | 50:50 | 0:100 | 100:0 | 40.8:49.2 | 100:0 | 50.8:49.2 |

TABLE VIII

| Test | Test Method |
|---|---|
| Shore A Hardness, instantaneous | ASTM D2240 |
| 5 sec. | |
| 30 sec. | |
| 100% Modulus, psi | ASTM D412 |
| 300% Modulus, psi | ASTM D412 |
| Tensile Strength, psi | ASTM D412 |
| Elongation, % | ASTM D412 |
| Tear Strength, pli | |
| Compression Set B, % | ASTM D395 |
| 22 Hr. @ 100° C. | |
| 22 Hr. @ 150° C. | |
| Volume Swell, % | ASTM D-471 |
| Hardness Change, points | ASTM D2240 |
| Spiral flow, cm @ 800 psi | Length of filled portion of a spiral-shaped mold having mold pathway of 0.3 cm diameter at 260° C. |
| MFR @ 230° C., 10K g | ASTM D1238 |

TABLE IX

| Component | Blend Components |
|---|---|
| Bromobutyl 2244 | Brominated isoprene-isobutylene copolymer, 41-51 Mooney viscosity (1 + 8) 125° C. [Exxon Chemical] |
| FLEXON 845 | Paraffinic oil ASTM D2226 type 104B [Exxon Company, USA] |
| HVA-2 | N,N-m-phenylenedimaleimide [E. I. DuPont] |
| IRGANOX 1010 | Hindered phenolic antioxidant, thermal stabilizer [CIBA-GEIGY] |
| MAGLITE D | Magnesium Oxide [C. P. Hall Co.] |
| NEUTRAL 600 | Extracted paraffinic oil [Exxon Company, USA] |
| NUCAP 190 CLAY | Mercapto silane functional hydrated aluminum silicate [J. M. Huber Corp.] |
| PERKADOX 14/40 | 40% a,a'bis(t-butylperoxy) diisopropyl benzene on clay filler [Akzo Chemie] |
| PP COPOLYMER PPH 1022 | Polypropylene copolymer, 0.5 MFR [Hoechst] |
| PP COPOLYMER 7824 | Random reactor copolymer of propylene with minor amount ethylene, MFR of 0.4 [Neste Polypropylen N.V., Beringen, Belgium] |
| PP HOMOPOLYMER PPH 1050 | Polypropylene homopolymer 0.3 MFR [Hoechst] |
| PP 5052 | Polypropylene homo-polymer, density 0.90 g/cm$^3$, MFR 1.2 [Exxon Chemical] |
| PROTOX 169 | French process zinc oxide [New Jersey Zinc] |
| SANTOPRENE | Thermoplastic elastomer based on EPDM in polypropylene [Monsanto] |
| SnCl$_2$.H$_2$O | Tin chloride monohydrate [Any] |
| SP 1056 | Brominated alkyl phenol resin [Schenactady Chemical] |
| SRF 762 | Carbon black [Cabot] |
| Stearic Acid | Long chain fatty acid |
| SUNPAR 150 | Paraffinic oil [Sun Oil Company] |
| SUNPAR 2280 | Paraffinic Oil [Sun Oil Co.] |

TABLE IX-continued

Blend Components

| Component | |
|---|---|
| TITANOX 2071 | Titanium dioxide [NL Industries, Inc.] |
| TRANSLINK 37 | Calcined and surface modified kaolin [KMG Minerals, Inc.] |
| ULTRANOX 626 | Bis (2,4-di-tert-butylphenyl) pentaerythritol diphosphite [Borg-Warner Chemicals, Inc.] |
| VANOX MTI | 2-mercaptotoluimidizaole [R. T. Vanderbilt Co., Inc.] |
| VANOX PML | Di-ortho guanidine salt of dicathechol borate [R. T. Vanderbilt Co., Inc.] |
| VISTALON 3666 | Ethylene-propylene-ethylidene norbornene product, 49 Mooney viscosity (1 + 8) 127° C. [Exxon Chemical] |
| VISTALON 6630 | Ethylene-propylene-ethylidene norbornene product, 31 Mooney viscosity (1 + 8) 127° C. [Exxon Chemical] |
| VISTALON 808 | Ethylene-propylene copolymer, 40 Mooney viscosity (1 + 8) 127° C. [Exxon Chemical] |
| WAX ANTILUX | Blend of selected paraffins and microwaxes [Rhein Chemie] |
| ZnO | Zinc oxide [Any source, e.g. New Jersey Zinc] |

Although the invention has been described with reference to its preferred embodiments, those of ordinary skill in the art may, upon reading this disclosure, appreciate changes and modifications which may be made which do not depart from the scope and spirit of the invention as described above or claimed hereafter.

We claim:

1. A dynamically vulcanized thermoplastic composition comprising:
   (a) a primary elastomer consisting of bromobutyl rubber;
   (b) a secondary elastomer selected from the group consisting of EPM, EPDM and mixtures thereof; and
   (c) a plastic matrix of a crystalline polyolefin comprising polypropylene;

wherein said primary elastomer is substantially fully cured with a peroxide cure system in combination with a maleimide co-agent; and wherein said secondary elastomer is substantially fully cured.

2. The composition of claim 1 wherein said crystalline polyolefin is a homo or copolymer of polypropylene.

3. The composition of claim 2, wherein said secondary elastomer is EPDM.

4. The composition of claim 2, wherein said maleimid co-agent is m-phenylene bismaleimide.

5. The composition of claim 1, wherein said primary elastomer is from about 10 wt. % to about 90 wt. % based on the weight of the elastomers.

6. The composition of claim 1, wherein said primary elastomer is from about 40 wt. % to about 60 wt. % based on the weight of the elastomers.

7. The composition of claim 1, wherein said secondary elastomer is from about 10 wt. % to about 90 wt. % based on the weight of the elastomers.

8. The composition of claim 1, wherein said secondary elastomer is from about 40 wt. % to about 60 wt. % based on the weight of the elastomers.

9. The composition of claim 1, wherein said crystalline polyolefin is from about 10 wt. % to about 90 wt. % based on the weight of the elastomers and the crystalline polyolefin.

10. The composition of claim 1, wherein said crystalline polyolefin is from about 30 wt. % to about 40 wt. % based on the weight of the elastomers and the crystalline polyolefin.

11. The composition of claim 3, wherein said primary elastomer is from about 10 wt. % to about 90 wt. % based on the weight of the elastomers.

12. The composition of claim 3, wherein said primary elastomer is from about 40 wt. % to about 60 wt % based on the weight of the elastomers.

13. The composition of claim 3, wherein said secondary elastomer is from about 10 wt. % to about 90 wt. % based on the weight of the elastomers.

14. The composition of claim 3, wherein said secondary elastomer is from about 40 wt. % to about 60 wt. % based on the weight of the elastomers.

15. The composition of claim 3, wherein said crystalline polyolefin is from about 10 wt. % to about 90 wt. % based on the weight of the elastomers and the crystalline polyolefin.

16. The composition of claim 3, wherein said crystalline polyolefin is from about 30 wt. % to about 40 wt. % based on the weight of the elastomers and the crystalline polyolefin.

17. The composition of claim 1, wherein said primary elastomer and said secondary elastomer are present in said composition as particles dispersed in said plastic matrix.

* * * * *